United States Patent
Desjardins

(10) Patent No.: US 12,146,444 B1
(45) Date of Patent: Nov. 19, 2024

(54) GEARBOX ASSEMBLY FOR AN AIRCRAFT PROPULSION SYSTEM

(71) Applicant: Pratt & Whitney Canada Corp., Longueuil (CA)

(72) Inventor: Michel Desjardins, St Hubert (CA)

(73) Assignee: Pratt & Whitney Canada Corp., Longueuil (CA)

( * ) Notice: Subject to any disclaimer, the term of this patent is extended or adjusted under 35 U.S.C. 154(b) by 0 days.

(21) Appl. No.: 18/143,965

(22) Filed: May 5, 2023

(51) Int. Cl.
*F02C 7/36* (2006.01)
*F02C 3/107* (2006.01)
(Continued)

(52) U.S. Cl.
CPC .............. *F02C 7/36* (2013.01); *F16H 1/34* (2013.01); *F02C 3/107* (2013.01); *F02C 3/113* (2013.01); *F02C 9/56* (2013.01); *F05D 2260/40* (2013.01); *F05D 2260/4031* (2013.01); *F05D 2260/40311* (2013.01); *F16H 1/18* (2013.01); *F16H 1/28* (2013.01); *F16H 2001/2872* (2013.01); *F16H 2001/2881* (2013.01); *F16H 2001/289* (2013.01); *F16H 3/68* (2013.01); *F16H 2057/0203* (2013.01); *F16H 2057/02043* (2013.01); *F16H 57/082* (2013.01)

(58) Field of Classification Search
CPC .. F02C 3/10; F02C 3/107; F02C 3/103; F02C 3/113; F02C 3/13; F02C 3/20; F02C 6/00; F02C 7/32; F02C 7/36; F02C 9/56; F16H 1/18; F16H 1/28; F16H 2001/2872; F16H 2001/2881; F16H 2001/289; F16H 1/30; F16H 1/34; F16H 3/68; F16H 57/082; F16H 2057/0203; F16H 2057/02043; F16H 2061/0451; F05D 2260/40; F05D 2260/4031; F05D 2260/40311; F05D 2260/53
See application file for complete search history.

(56) References Cited

U.S. PATENT DOCUMENTS 7,507,180 B2   3/2009   Robuck
8,235,861 B2   8/2012   Lopez
(Continued)

FOREIGN PATENT DOCUMENTS

DE    102017126858 A1    5/2019
GB        861158 A       2/1961

OTHER PUBLICATIONS

EP search report for EP24173851.7 dated Sep. 10, 2024.

*Primary Examiner* — Binh Q Tran
(74) *Attorney, Agent, or Firm* — Getz Balich LLC

(57) ABSTRACT

An assembly for an aircraft propulsion system includes an output shaft and a gear assembly. The gear assembly is configured to drive rotation of the output shaft. The gear assembly includes a sun gear, a plurality of planet gears, a first ring gear, and a second ring gear. The sun gear is rotatable about a rotational axis. The sun gear includes a first double helical gear pattern. Each planet gear of the plurality of planet gears includes a main gear, a first lateral gear, and a second lateral gear. The main gear includes a second double helical gear pattern engaged with the first double helical gear pattern. The first lateral gear is engaged with the first ring gear. The second lateral gear is engaged with the second ring gear. The first ring gear is axially spaced from the second ring gear relative to the rotational axis.

16 Claims, 5 Drawing Sheets

(51) Int. Cl.
*F02C 3/113* (2006.01)
*F02C 9/56* (2006.01)
*F16H 1/18* (2006.01)
*F16H 1/28* (2006.01)
*F16H 1/34* (2006.01)
*F16H 3/68* (2006.01)
*F16H 57/02* (2012.01)
*F16H 57/08* (2006.01)

(56) References Cited

U.S. PATENT DOCUMENTS

| | | |
|---|---|---|
| 10,400,678 B2 | 9/2019 | Hallman |
| 10,473,554 B2 | 11/2019 | Larson |
| 10,487,917 B2 | 11/2019 | Chmylkowski |
| 10,533,451 B2 | 1/2020 | Klaus |
| 10,533,636 B2 | 1/2020 | Lundbäck |
| 10,975,717 B2 | 4/2021 | Moniz |
| 11,022,045 B2 | 6/2021 | Niepceron |
| 11,118,535 B2 | 9/2021 | Van Der Merwe |
| 11,174,782 B2 | 11/2021 | Desjardins |
| 11,174,916 B2 | 11/2021 | Desjardins |
| 11,339,725 B2 | 5/2022 | Simon |
| 11,492,979 B2 | 11/2022 | Beck |
| 11,542,829 B2 | 1/2023 | Facchini |
| 11,591,972 B2 | 2/2023 | Beck |
| 11,608,785 B2 | 3/2023 | Simon |
| 11,635,029 B2 | 4/2023 | Desjardins |
| 2009/0062058 A1* | 3/2009 | Kimes ............ F16H 1/28 475/344 |
| 2013/0004297 A1* | 1/2013 | Sheridan .......... F02K 3/04 415/122.1 |
| 2014/0155219 A1* | 6/2014 | McCune .......... F16H 57/0006 475/331 |
| 2018/0230902 A1 | 8/2018 | Desjardins |
| 2020/0025278 A1 | 1/2020 | Lundbäck |
| 2020/0300340 A1* | 9/2020 | Desjardins ......... F16H 1/28 |
| 2020/0332721 A1 | 10/2020 | Simon |
| 2021/0348521 A1* | 11/2021 | Facchini .......... F01D 5/022 |
| 2021/0388769 A1 | 12/2021 | Beck |
| 2021/0388770 A1* | 12/2021 | Hrubec ........... F16H 57/082 |
| 2021/0396184 A1 | 12/2021 | Beck |
| 2022/0145769 A1 | 5/2022 | Mouly |
| 2022/0235699 A1 | 7/2022 | Desjardins |
| 2023/0019277 A1 | 1/2023 | Frantz |
| 2023/0102913 A1 | 3/2023 | Simon |
| 2023/0130860 A1* | 4/2023 | Piazza ............ F02C 7/36 415/1 |

\* cited by examiner

GEARBOX ASSEMBLY FOR AN AIRCRAFT PROPULSION SYSTEM

TECHNICAL FIELD

This disclosure relates generally to aircraft propulsion systems and, more particularly, to speed-changing gearbox assemblies for aircraft propulsion systems.

BACKGROUND OF THE ART

Aircraft propulsion systems may include a speed-changing gearbox to drive one or more rotational loads. For example, an aircraft propulsion system may include a reduction gearbox (RGB) to drive a propeller at a reduced rotational speed relative to a turbine of a gas turbine engine. Various RGB assemblies are known in the art. While these known assemblies have various advantages, there is still room in the art for improvement.

SUMMARY

It should be understood that any or all of the features or embodiments described herein can be used or combined in any combination with each and every other feature or embodiment described herein unless expressly noted otherwise.

According to an aspect of the present disclosure, an assembly for an aircraft propulsion system includes an output shaft and a gear assembly. The gear assembly is configured to drive rotation of the output shaft. The gear assembly includes a sun gear, a plurality of planet gears, a first ring gear, and a second ring gear. The sun gear is rotatable about a rotational axis. The sun gear includes a first double helical gear pattern. Each planet gear of the plurality of planet gears includes a main gear, a first lateral gear, and a second lateral gear. The main gear includes a second double helical gear pattern engaged with the first double helical gear pattern. The first lateral gear is engaged with the first ring gear. The second lateral gear is engaged with the second ring gear. The first ring gear is axially spaced from the second ring gear relative to the rotational axis.

In any of the aspects or embodiments described above and herein, the first ring gear and the second ring gear may be rotationally fixed relative to the rotational axis.

In any of the aspects or embodiments described above and herein, each of the first ring gear and the second ring gear may include a first spur gear pattern and each of the first lateral gear and the second lateral gear may include a second spur gear pattern.

In any of the aspects or embodiments described above and herein, each of the first ring gear and the second ring gear may extend between and to an inner radial side and an outer radial side. The first spur gear pattern may be disposed at the inner radial side.

In any of the aspects or embodiments described above and herein, the main gear may have a first diameter and each of the first lateral gear and the second lateral gear may have a second diameter. The first diameter may be greater than the second diameter.

In any of the aspects or embodiments described above and herein, the assembly may further include a planet carrier. The planet carrier may include a carrier plate and a plurality of shafts. Each shaft of the plurality of shafts may be connected to a respective planet gear of the plurality of planet gears. The planet carrier plate may be connected to the output shaft.

In any of the aspects or embodiments described above and herein, the planet carrier may include a plurality of journal bearings, with each journal bearing positioned between a respective shaft of the plurality of shafts and a respective planet gear of the plurality of planet gears.

In any of the aspects or embodiments described above and herein, each journal bearing of the plurality of journal bearings may extend between and to a first axial end and a second axial end. Each journal bearing of the plurality of journal bearings may include a first shoulder disposed at the first axial end and a second shoulder disposed at the second axial end. Each of the first shoulder and the second shoulder may be positioned axially adjacent a respective planet gear of the plurality of planet gears.

In any of the aspects or embodiments described above and herein, the main gear, the first lateral gear, and the second lateral gear may form a monolithic body of each respective planet gear of the plurality of planet gears.

In any of the aspects or embodiments described above and herein, the first double helical gear pattern may include a first set of helical teeth and a second set of helical teeth. The first set of helical teeth may be circumferentially staggered relative to the second set of helical teeth.

In any of the aspects or embodiments described above and herein, the first double helical gear pattern may include a first set of helical teeth and a second set of helical teeth. The first set of helical teeth may be circumferentially aligned relative to the second set of helical teeth.

In any of the aspects or embodiments described above and herein, the main gear may have a first diameter and the sun gear may have a second diameter. The first diameter may be greater than the second diameter.

According to another aspect of the present disclosure, an aircraft propulsion system includes a propeller, a gas turbine engine, and a reduction gear box. The propeller is configured for rotation about a rotational axis. The gas turbine engine includes a bladed turbine rotor and a shaft connected to the bladed turbine rotor. The reduction gear box includes a gear assembly connected to the shaft and the propeller. The gear assembly is configured to drive the propeller at a reduced rotational speed relative to the shaft. The gear assembly includes a sun gear, a plurality of planet gears, and a first ring gear, and a second ring gear. The sun gear is rotatable about a rotational axis. The sun gear includes a first double helical gear pattern. Each planet gear of the plurality of planet gears includes a main gear, a first lateral gear, and a second lateral gear. The main gear includes a second double helical gear pattern engaged with the first double helical gear pattern. The first lateral gear is engaged with the first ring gear. The second lateral gear is engaged with the second ring gear.

In any of the aspects or embodiments described above and herein, the first ring gear and the second ring gear may be rotationally fixed relative to the rotational axis.

In any of the aspects or embodiments described above and herein, each of the first ring gear and the second ring gear may include a first spur gear pattern and each of the first lateral gear and the second lateral gear may include a second spur gear pattern.

According to another aspect of the present disclosure, an assembly for an aircraft propulsion system includes an output shaft and a gear assembly. The gear assembly is configured to drive rotation of the output shaft. The gear assembly includes a sun gear, a plurality of planet gears, a first ring gear, and a second ring gear. The sun gear is rotatable about a rotational axis. The sun gear includes a first double helical gear pattern. Each planet gear of the plurality of planet gears includes a main gear, a first lateral gear, and a second lateral gear. The main gear includes a second double helical gear pattern engaged with the first double helical gear pattern. The first lateral gear is engaged with the first ring gear. The second lateral gear is engaged with the second ring gear. Each of the first ring gear and the second ring gear includes a first spur gear pattern and each of the first lateral gear and the second lateral gear includes a second spur gear pattern.

In any of the aspects or embodiments described above and herein, each of the first ring gear and the second ring gear may extend between and to an inner radial side and an outer radial side. The first spur gear pattern may be disposed at the inner radial side.

In any of the aspects or embodiments described above and herein, the main gear may have a first diameter. Each of the first lateral gear and the second lateral gear may have a second diameter. The first diameter may be greater than the second diameter.

In any of the aspects or embodiments described above and herein, the first double helical gear pattern may include a first set of helical teeth and a second set of helical teeth. The first set of helical teeth may be circumferentially staggered relative to the second set of helical teeth.

In any of the aspects or embodiments described above and herein, the assembly may further include a planet carrier. The planet carrier may include a carrier plate and a plurality of shafts. Each shaft of the plurality of shafts may be connected to a respective planet gear of the plurality of planet gears. The carrier plate may be rotationally fixed relative to the rotational axis.

The present disclosure, and all its aspects, embodiments and advantages associated therewith will become more readily apparent in view of the detailed description provided below, including the accompanying drawings.

DETAILED DESCRIPTION

Figure 1:
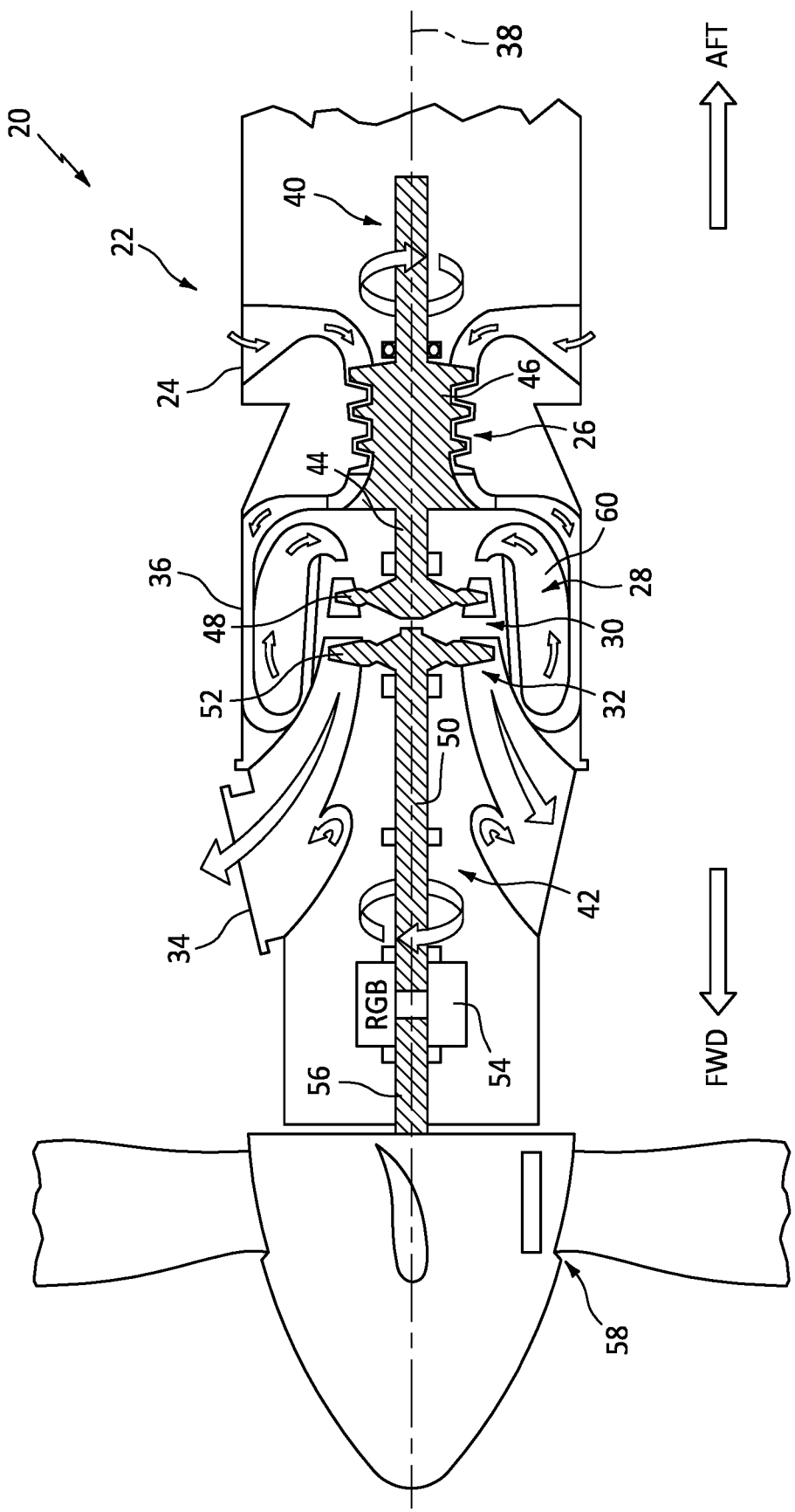
FIG. 1 schematically illustrates a side, cutaway view of an aircraft propulsion system, in accordance with one or more embodiments of the present disclosure.

FIG. 1 illustrates a propulsion system 20 configured for an aircraft. Briefly, the aircraft may be a fixed-wing aircraft (e.g., an airplane), a rotary-wing aircraft (e.g., a helicopter), a tilt-rotor aircraft, a tilt-wing aircraft, or any other aerial vehicle. Moreover, the aircraft may be a manned aerial vehicle or an unmanned aerial vehicle (UAV, e.g., a drone). The aircraft propulsion system 20 of FIG. 1 includes a gas turbine engine 22. However, the present disclosure is also applicable to propulsion systems which do not include gas turbine engines such as, but not limited to, a battery-electric propulsion system (e.g., an electric-motor driven propeller system).

FIG. 1 illustrates a side, cutaway view of the gas turbine engine 22. The gas turbine engine 22 of FIG. 1 is configured as a turboprop gas turbine engine, however, the present disclosure is not limited to turboprop gas turbine engines. It should be understood that aspects of the present disclosure may be equally applicable to other types of gas turbine engines including, but not limited to, a turboshaft gas turbine engine, a turbofan gas turbine engine, a turbojet gas turbine engine, or an open rotor gas turbine engine.

The gas turbine engine 22 of FIG. 1 includes an air inlet 24, a compressor 26, a combustor 28, a high-pressure turbine 30, a power turbine 32, an exhaust 34, and an engine static structure 36. The air inlet 24, the compressor 26, the combustor 28, the high-pressure turbine 30, the power turbine 32, and the exhaust 34 are arranged along an axial centerline 38 (e.g., a rotational axis) of the gas turbine engine 22. The engine static structure 36 may include, for example, one or more engine cases for the gas turbine engine 22. The engine static structure 36 may additionally include cowlings, bearing assemblies, and/or other structural components of the gas turbine engine 22. The one or more engine cases form, house, and/or structurally support one or more of the air inlet 24, the compressor 26, the combustor 28, the high-pressure turbine 30, the power turbine 32, and the exhaust 34.

Components of the gas turbine engine 22 of FIG. 1, such as components of the compressor 26, the high-pressure turbine 30, and the power turbine 32, are arranged as a first rotational assembly 40 (e.g., a high-pressure spool) and a second rotational assembly 42 (e.g., a power spool). The first rotational assembly 40 and the second rotational assembly 42 are mounted for rotation about the axial centerline 38 relative to the engine static structure 36. The gas turbine engine 22 of FIG. 1 has a "free turbine" configuration. The present disclosure, however, is not limited to free turbine gas turbine engine configurations.

The first rotational assembly 40 includes a first shaft 44, a bladed compressor rotor 46 for the compressor 26, and a bladed first turbine rotor 48 for the high-pressure turbine 30. The first shaft 44 interconnects the bladed compressor rotor 46 and the bladed first turbine rotor 48.

The second rotational assembly 42 includes a second shaft 50, a bladed second turbine rotor 52 for the power turbine 32, a reduction gear box (RGB) 54, a drive shaft 56, and a rotational load 58. The second shaft 50 is connected to the bladed power turbine rotor 52. The drive shaft 56 is connected to the rotational load 58. The second shaft 50 and the drive shaft 56 are mechanically coupled with the RGB 54. The RGB 54 is configured to drive the drive shaft 56 at a reduced rotational speed relative to the second shaft 50. In other words, the RGB 54 is configured to facilitate a reduced speed ratio between the second shaft 50 and the drive shaft 56 in driving engagement with the rotational load 58. The rotational load 58 of FIG. 1 is configured as a propeller. The present disclosure, however, is not limited to propellers for the rotational load 58.

During operation of the gas turbine engine 22 of FIG. 1, ambient air enters the gas turbine engine 22 through the air inlet 24 and is directed into the compressor 26. The ambient air is compressed by the bladed compressor rotor 46 and directed into a combustion chamber 60 of the combustor 28. Fuel is injected into the combustion chamber 60 and mixed with the compressed air to provide a fuel-air mixture. This fuel-air mixture is ignited, and combustion products thereof flow through and sequentially cause the bladed first turbine rotor 48 and the bladed second turbine rotor 52 to rotate. The rotation of the bladed first turbine rotor 48 and the bladed second turbine rotor 52 respectively drive rotation of the first rotational assembly 40 and the second rotational assembly 42. Rotation of the second rotational assembly 42 further drives rotation of the rotational load 58 (e.g., the propeller) of FIG. 1 by the RGB 54, as previously discussed, to provide propulsion (e.g., thrust) for the propulsion system 20. Combustion exhaust gas flowing past the bladed second turbine rotor 52 is directed out of the gas turbine engine 22 through the exhaust 34.

Figure 2:
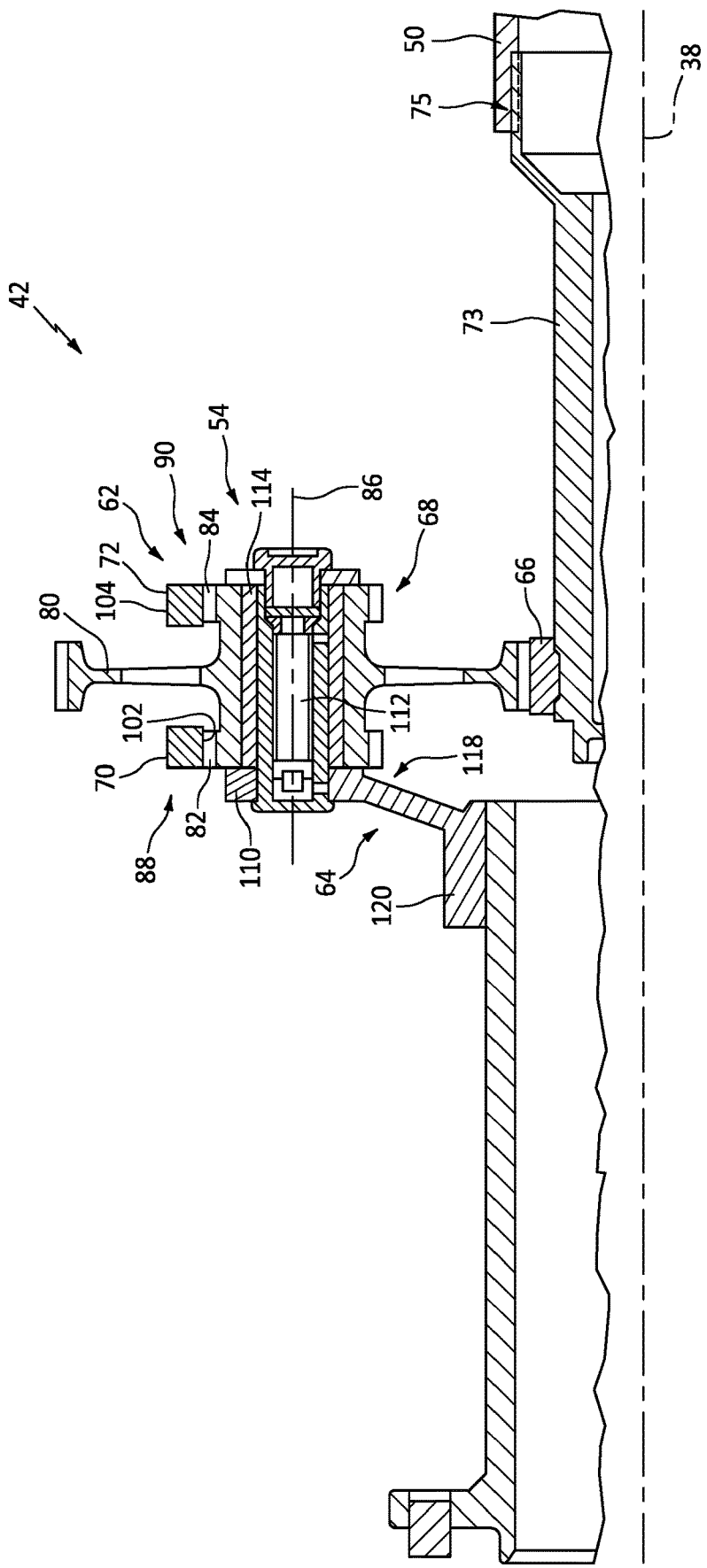
FIG. 2 illustrates a side, cutaway view of a portion of a rotational assembly for the aircraft propulsion system of FIG. 1, in accordance with one or more embodiments of the present disclosure.

FIG. 2 illustrates a side, cutaway view of a portion of the second rotational assembly 42 including the RGB 54. The RGB 54 of FIG. 2 includes a gear assembly 62 (e.g., a planetary gear assembly; sometimes referred to as an "epicyclic gear assembly") and a planet carrier 64. The gear assembly 62 and the planet carrier 64 operably couple the second shaft 50 to the drive shaft 56.

Figure 3:
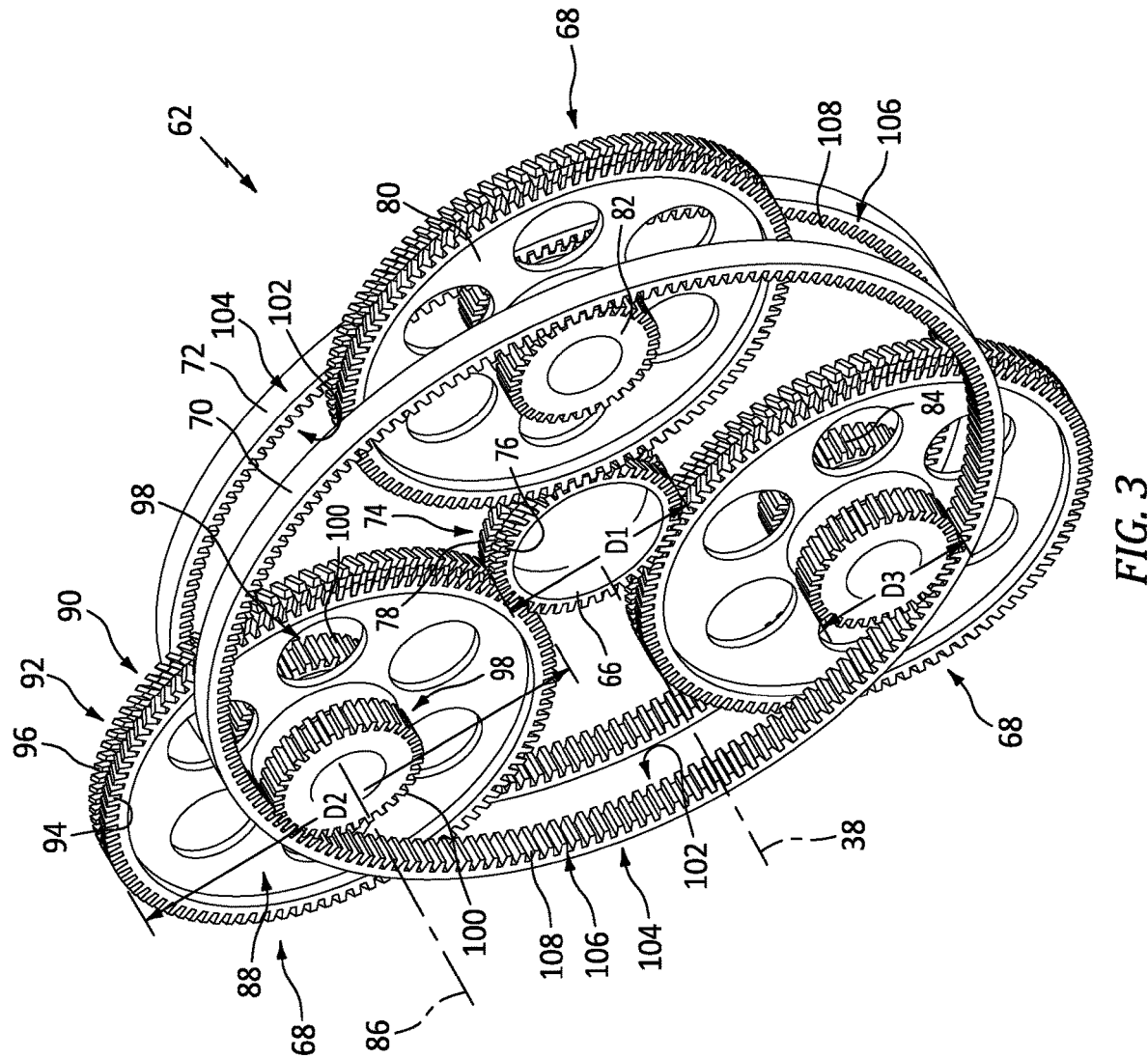
FIG. 3 illustrates a perspective view of a gear assembly for the rotational assembly of FIG. 2, in accordance with one or more embodiments of the present disclosure.
Figure 4:
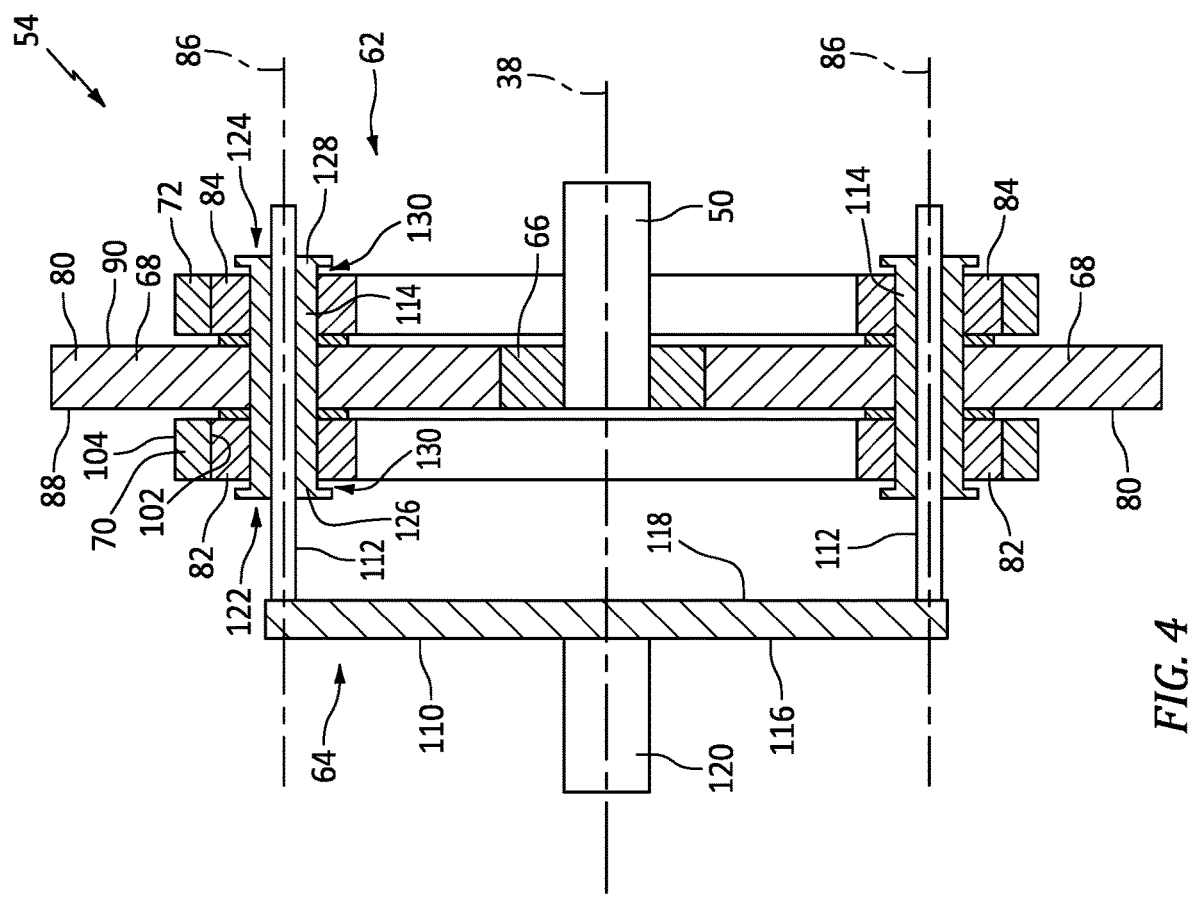
FIG. 4 illustrates a cutaway view of a portion of the gear assembly for the rotational assembly of FIG. 2, in accordance with one or more embodiments of the present disclosure.

Referring to FIGS. 2-4, the gear assembly 62 includes a sun gear 66, a plurality of planet gears 68, a first ring gear 70, and a second ring gear 72. FIG. 3 illustrates a perspective view of the gear assembly 62. FIG. 4 illustrates a side, cutaway view of a portion of the gear assembly 62.

The sun gear 66 is mounted on, formed by, or otherwise connected to the second shaft 50 (e.g., by one or more intermediate components). For example, the sun gear 66 of FIG. 2 is mounted on a drive shaft 73. The drive shaft 73 of FIG. 2 is mounted to the second shaft 50 by a splined connection 75 allowing axial movement between the drive shaft 73 and the second shaft 50. The sun gear 66 is configured to rotate with the second shaft 50 about the axial centerline 38. The sun gear 66 of FIG. 3 includes a double helical gear pattern 74 (sometimes referred to as a "herringbone" pattern). The double helical gear pattern 74 is formed by a first set of helical teeth 76 and a second set of helical teeth 78. Each of the first set of helical teeth 76 and the second set of helical teeth 78 includes a plurality of teeth arranged circumferentially about (e.g., completely around) the sun gear 66. The first set of helical teeth 76 are disposed adjacent (e.g., laterally adjacent) the second set of helical teeth 78. The plurality of teeth of the first set of helical teeth 76 are angled in opposite directions relative to the plurality of teeth of the second set of helical teeth 78. The sun gear 66 has a diameter D1 (e.g., extending perpendicular to the axial centerline 38). In some embodiments, the sun gear 66 may include a spur gear pattern as an alternative to the double helical gear pattern 74.

Each of the plurality of planet gears 68 includes a main gear 80, a first lateral gear 82, and a second lateral gear 84. The main gear 80, the first lateral gear 82, and the second lateral gear 84 may form a single, monolithic body of the respective planet gear 68. The gear assembly 62 of FIG. 3 includes three planet gears 68, however, the present disclosure is not limited to any particular number of planet gears for the planet gear assembly 62.

The main gear 80 extends circumferentially about (e.g., completely around) a planet gear axis 86. The main gear 80 has a diameter D2 (e.g., extending perpendicular to the planet gear axis 86). The diameter D2 may be greater than the diameter D1 of the sun gear 66. The main gear 80 extends (e.g., along the planet gear axis 86) between and to a first lateral side 88 of the main gear 80 and a second lateral side 90 of the main gear 80. The main gear 80 includes a double helical gear pattern 92 matching the double helical gear pattern 74. The double helical gear pattern 92 meshes with (e.g., is operably engaged with) the double helical gear pattern 74. Similar to the double helical gear pattern 74, the double helical gear pattern 92 is formed by a first set of helical teeth 94 and a second set of helical teeth 96. Each of the first set of helical teeth 94 and the second set of helical teeth 96 includes a plurality of teeth arranged circumferentially about (e.g., completely around) the main gear 80. The first set of helical teeth 94 are disposed adjacent (e.g., laterally adjacent) the second set of helical teeth 96. The plurality of teeth of the first set of helical teeth 94 are angled in opposite directions relative to the plurality of teeth of the second set of helical teeth 96. In embodiments in which the sun gear includes a spur gear pattern, the main gear 80 may also include a spur gear pattern as an alternative to the double helical gear pattern 92.

The double helical gear pattern 74 and the double helical gear pattern 92 facilitate higher loading capacity of the gear assembly 62. For example, the gear assembly 62 may exhibit a greater power output for a same geometrical envelope size in comparison to at least some conventional gear assemblies. The splined connection 75 between the drive shaft 73 and the second shaft 50 facilitates axial looseness of the gear assembly 62 relative to the second shaft 50 to accommodate axial movement (e.g., due to gear assembly 62 tolerance stack up, gear assembly 62 loading, and thermal deflection) of the gear assembly 62 which may be more significant, in comparison to at least some conventional gear assemblies, due to the double helical gear pattern 74, 92 mating arrangement between the sun gear 66 and the main gears 80.

Each of the first lateral gear 82 and the second lateral gear 84 extends circumferentially about (e.g., completely around) a planet gear axis 86. Each of the first lateral gear 82 and the second lateral gear 84 has a diameter D3 (e.g., extending perpendicular to the planet gear axis 86). The diameter D3 may be less than the diameter D1 of the sun gear 66 and/or the diameter D2 of the main gear 80. The first lateral gear 82 is disposed at (e.g., on, adjacent, or proximate) the first lateral side 88. The second lateral gear 84 is disposed at (e.g., on, adjacent, or proximate) the second lateral side 90. Each of the first lateral gear 82 and the second lateral gear 84 include a spur gear pattern 98. The spur gear pattern 98 includes a plurality of teeth 100 arranged circumferentially about (e.g., completely around) the first lateral gear 82 and the second lateral gear 84, respectively. The plurality of teeth 100 extend axially or substantially axially relative to the planet gear axis 86. In some embodiments, the first lateral gear 82 and the second lateral gear 84 may include a helical gear pattern as an alternative to the spur gear pattern 98. The helical gear pattern of the first lateral gear 82 and the second lateral gear 84 may form a double helical gear configuration. For example, the teeth of the helical gear pattern for the first lateral gear 82 may be angled in opposite directions relative to the teeth of the helical gear pattern for the second lateral gear 84.

Each of the first ring gear 70 and the second ring gear 72 extend circumferentially about (e.g., completely around) the axial centerline 38. The first ring gear 70 is spaced (e.g., laterally spaced) from the second ring gear 72 along the axial centerline 38. Each of the first ring gear 70 and the second ring gear 72 extends between and to an inner radial side 102 of the respective ring gear 70, 72 and an outer radial side 104 of the respective ring gear 70, 72. Each of the first ring gear 70 and the second ring gear 72 include a spur gear pattern 106. The spur gear pattern 106 includes a plurality of teeth 108 arranged circumferentially about (e.g., completely around) the first ring gear 70 and the second ring gear 72, respectively, at (e.g., on, adjacent, or proximate) the inner radial side 102. The plurality of teeth 108 extend axially or substantially axially relative to the axial centerline 38. The spur gear pattern 106 of the first ring gear 70 meshes with (e.g., is operably engaged with) the spur gear pattern 98 of the first lateral gear 82 for each planet gear 68. The spur gear pattern 106 of the second ring gear 72 meshes with (e.g., is operably engaged with) the spur gear pattern 98 of the second lateral gear 84 for each planet gear 68. Each of the first ring gear 70 and the second ring gear 72 may be rotationally fixed relative to the axial centerline 38. For example, the first ring gear 70 and the second ring gear 72 may be fixedly mounted to the engine static structure 36 (see FIG. 1) or another fixed structure of the propulsion system 20 (see FIG. 1). In embodiments in which the first lateral gear 82 and the second lateral gear 84 include a helical gear pattern, the first ring gear 70 and the second ring gear 72 may also include a matching gear pattern as an alternative to the spur gear pattern 106.

FIGS. 2 and 4 illustrate portions of the planet carrier 64. The planet carrier 64 includes a carrier plate 110 and a plurality of planet shafts 112. The planet carrier 64 may further include a plurality of bearings 114.

The carrier plate 110 extends circumferentially about (e.g., completely around) the axial centerline 38. The carrier plate 110 extends between and to a first lateral side 116 of the carrier plate 110 and a second lateral side 118 of the carrier plate 110. The first lateral side 116 is coupled to the drive shaft 56. The carrier plate 110 of FIG. 4 includes a connector 120 at (e.g., on, adjacent, or proximate) the first lateral side 116. The connector 120 is mounted to the drive shaft 56 (e.g., by a splined connection) and configured to drive rotation of the drive shaft 56 based on rotation of the planet carrier 64. Alternatively, however, the drive shaft 56 may be directly coupled to the carrier plate 110.

The plurality of planet shafts 112 extend outward from the second lateral side 118. Each planet shaft 112 is rotatably coupled to a respective one of the planet gears 68. For example, the planet carrier 64 may include three planet shafts 112 corresponding to the three respective planet gears 68 of the gear assembly 62 of FIGS. 2-4. Each planet shaft 112 extends (e.g., axially extends) through the respective planet gear 68 along the planet gear axis 86 for the respective planet gear 68. Thus, each planet gear 68 is mounted on a respective one of the planet shafts 112 for rotation about the respective planet gear axis 86.

The planet carrier 64 may further include the plurality of bearings 114, with each bearing 114 disposed between each planet shaft 112 and each respective planet gear 68. Each bearing 114 is extends circumferentially about (e.g., completely around) a respective one of the planet shafts 112 to rotatably support the respective one of the planet gears 68. Each bearing 114 may be fixedly mounted onto a respective one of the planet shafts 112. The plurality of bearings 114 may be configured, for example, as journal bearings (e.g., plain bearings), oil film bearings, or the like.

Each bearing 114 extends (e.g., axially extends along the respective planet gear axis 86) between and to a first lateral end 122 of the bearing 114 and a second lateral end 124 of the bearing 114. Each bearing 114 may include a first shoulder portion 126 and a second shoulder portion 128. The first shoulder portion 126 may be disposed at (e.g., on, adjacent, or proximate) the first lateral side 122. The second shoulder portion 128 may be disposed at (e.g., on, adjacent, or proximate) the second lateral end 124. The first shoulder portion 126 and the second shoulder portion 128 may extend radially outward (e.g., relative to the planet gear axis 86) from surrounding portions of the bearing 114. The first shoulder portion 126 and the second shoulder portion 128 may prevent or limit relative axial movement (e.g., relative to the planet gear axis 86) of the planet gears 68 which may otherwise result due to the spur gear patterns 98, 106 of the lateral gears 82, 84 and the ring gears 70, 72. The bearing 114 may form an axial gap 130 between the first lateral gear 82 and the first shoulder portion 126 and/or between the second lateral gear 84 and the second shoulder portion 128 to accommodate some axial movement of the planet gears 68. However, the present disclosure is not limited to the formation of the axial gap 130 between the bearing 114 and the respective planet gear 68.

During operation of the RGB 54, the second shaft 50 drives rotation of the sun gear 66 about the axial centerline 38. The sun gear 66 effects rotation of the plurality of planet gears 68 (e.g., by engagement with the main gear 80) about the respective planet gear axis 86 of each planet gear 68. Rotation of the planet gears 68 causes the planet gears 68 to circumferentially travel along the first ring gear 70 and the second ring gear 72 (e.g., by engagement with first lateral gear 82 and the second lateral gear 84), thereby effecting rotation of the planet carrier 64 and driving the drive shaft 56 and the rotational load 58. Accordingly, the RGB 54 drives the drive shaft 56 at a reduced rotational speed relative to the second shaft 50 (e.g., a reduced speed ratio).

As previously discussed, the first ring gear 70 and the second ring gear 72 may be rotationally fixed (e.g., relative to the axial centerline 38) and the rotation of the planet gears 68 about the first ring gear 70 and the second ring gear 72 may drive rotation of the planet carrier 64, the drive shaft 56, and the rotational load 58. In alternative embodiments (e.g., a star gear assembly), the first ring gear 70 and the second ring gear 72 may be configured for rotation about the axial centerline 38. For example, the first ring gear 70 and the second ring gear 72 may be mounted to the drive shaft 56 and configured to drive rotation of the drive shaft 56 and the rotational load 58. In this alternative embodiment, the planet carrier 64 may be rotationally fixed (e.g., relative to the axial centerline 38). Accordingly, the planet carrier 64 may rotationally fix the planet gears 68 relative to the axial centerline 38. Rotation of the planet gears 68 may, therefore, cause the first ring gear 70 and the second ring gear 72 to rotate about the axial centerline 38, thereby driving the drive shaft 56 and the rotational load 58.

Figure 6:
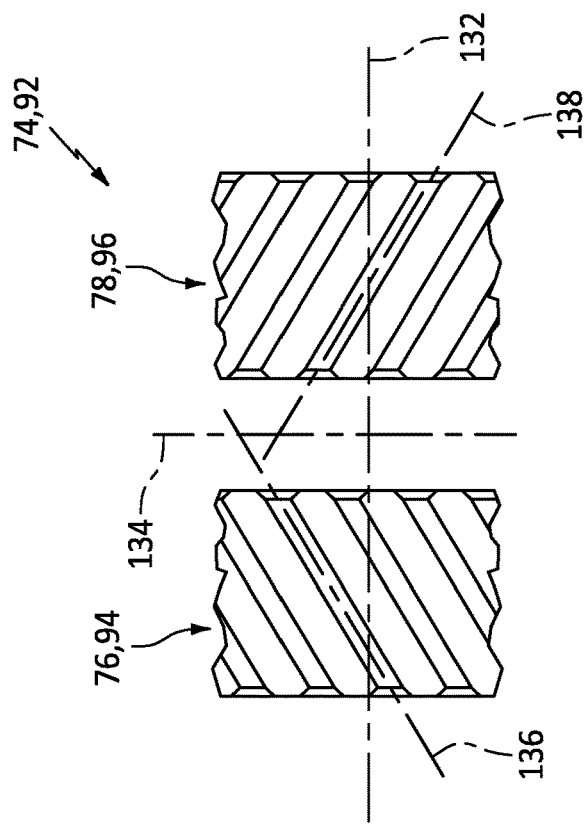
FIG. 6 illustrates a view of a circumferential portion of another double helical gear pattern for the gear assembly of FIG. 3, in accordance with one or more embodiments of the present disclosure.
Figure 5:
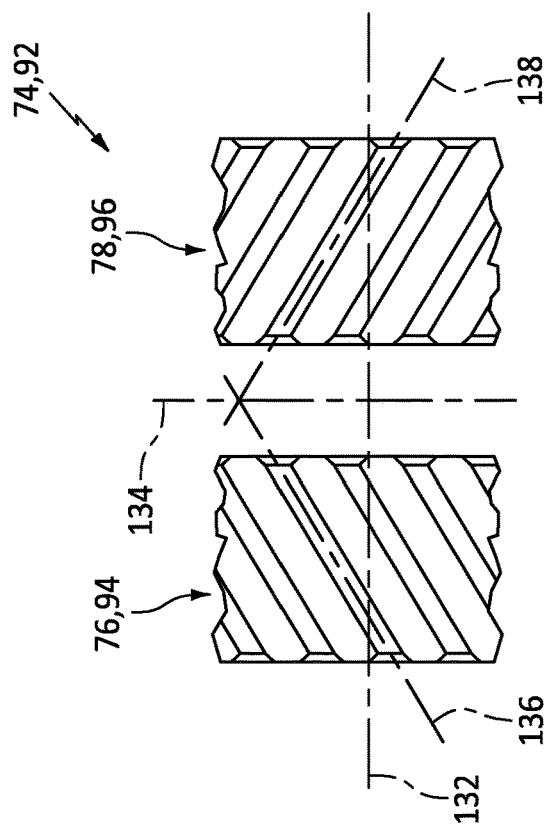
FIG. 5 illustrates a view of a circumferential portion of a double helical gear pattern for the gear assembly of FIG. 3, in accordance with one or more embodiments of the present disclosure.

Referring to FIGS. 5 and 6, portions of exemplary configurations of the double helical gear pattern 74 and the double helical gear pattern 92 are illustrated. The double helical gear patterns 74, 92 of FIGS. 5 and 6 are illustrated relative to an axial reference line 132 (e.g., parallel to the axial centerline 38; see FIGS. 1 and 2) and a circumferential reference line 134 (e.g., extending circumferentially about the axial centerline 38). The circumferential reference line 134 of FIGS. 5 and 6 is disposed axially equidistant between the first set of helical teeth 76, 94 and the second set of helical teeth 78, 96. A direction of the orientation (e.g., helical orientation) of the first set of helical teeth 76, 94 is identified by a first helical axis 136 extending through a middle position of the first set of helical teeth 76, 94. In other words, the first set of helical teeth 76, 94 extend in a direction along the first helical axis 136. A direction of the orientation (e.g., helical orientation) of the second set of helical teeth 78, 96 is identified by a second helical axis 138 extending through a middle position of the second set of helical teeth 78, 96. In other words, the second set of helical teeth 78, 96 extend (e.g., axially extend) in a direction along the second helical axis 138. In some embodiments, the first set of helical teeth 76, 94 and the second set of helical teeth 78, 96 may be synchronous (e.g., circumferentially aligned), as shown in FIG. 5. For example, the first helical axis 136 and the second helical axis 138 of FIG. 5 intersect at the circumferential reference line 134. In some other embodiments, the first set of helical teeth 76, 94 and the second set of helical teeth 78, 96 may be asynchronous (e.g., circumferentially staggered), as shown in FIG. 6. For example, the first helical axis 136 and the second helical axis 138 of FIG. 6 intersect the circumferential reference line 134 at circumferentially offset positions. The asynchronous configuration of the first set of helical teeth 76, 94 and the second set of helical teeth 78, 96 may facilitate reduced torque fluctuation of the gear assembly 62 (see FIGS. 2-4), for example, in comparison to a synchronous configuration of the first set of helical teeth 76, 94 and the second set of helical teeth 78, 96.

While the principles of the disclosure have been described above in connection with specific apparatuses and methods, it is to be clearly understood that this description is made only by way of example and not as limitation on the scope of the disclosure. Specific details are given in the above description to provide a thorough understanding of the embodiments. However, it is understood that the embodiments may be practiced without these specific details.

It is noted that the embodiments may be described as a process which is depicted as a flowchart, a flow diagram, a block diagram, etc. Although any one of these structures may describe the operations as a sequential process, many of the operations can be performed in parallel or concurrently. In addition, the order of the operations may be rearranged. A process may correspond to a method, a function, a procedure, a subroutine, a subprogram, etc.

The singular forms "a," "an," and "the" refer to one or more than one, unless the context clearly dictates otherwise. For example, the term "comprising a specimen" includes single or plural specimens and is considered equivalent to the phrase "comprising at least one specimen." The term "or" refers to a single element of stated alternative elements or a combination of two or more elements unless the context clearly indicates otherwise. As used herein, "comprises" means "includes." Thus, "comprising A or B," means "including A or B, or A and B," without excluding additional elements.

It is noted that various connections are set forth between elements in the present description and drawings (the contents of which are included in this disclosure by way of reference). It is noted that these connections are general and, unless specified otherwise, may be direct or indirect and that this specification is not intended to be limiting in this respect. Any reference to attached, fixed, connected, or the like may include permanent, removable, temporary, partial, full and/or any other possible attachment option.

No element, component, or method step in the present disclosure is intended to be dedicated to the public regardless of whether the element, component, or method step is explicitly recited in the claims. No claim element herein is to be construed under the provisions of 35 U.S.C. 112(f) unless the element is expressly recited using the phrase "means for." As used herein, the terms "comprise", "comprising", or any other variation thereof, are intended to cover a non-exclusive inclusion, such that a process, method, article, or apparatus that comprises a list of elements does not include only those elements but may include other elements not expressly listed or inherent to such process, method, article, or apparatus.

While various inventive aspects, concepts and features of the disclosures may be described and illustrated herein as embodied in combination in the exemplary embodiments, these various aspects, concepts, and features may be used in many alternative embodiments, either individually or in various combinations and sub-combinations thereof. Unless expressly excluded herein all such combinations and sub-combinations are intended to be within the scope of the present application. Still further, while various alternative embodiments as to the various aspects, concepts, and features of the disclosures—such as alternative materials, structures, configurations, methods, devices, and components, and so on—may be described herein, such descriptions are not intended to be a complete or exhaustive list of available alternative embodiments, whether presently known or later developed. Those skilled in the art may readily adopt one or more of the inventive aspects, concepts, or features into additional embodiments and uses within the scope of the present application even if such embodiments are not expressly disclosed herein. For example, in the exemplary embodiments described above within the Detailed Description portion of the present specification, elements may be described as individual units and shown as independent of one another to facilitate the description. In alternative embodiments, such elements may be configured as combined elements.

The invention claimed is:

1. An assembly for an aircraft propulsion system, the assembly comprising:
   an output shaft;
   a gear assembly configured to drive rotation of the output shaft, the gear assembly including a sun gear, a plurality of planet gears, a first ring gear, and a second ring gear,
   the sun gear is rotatable about a rotational axis, the sun gear includes a first double helical gear pattern,
   each planet gear of the plurality of planet gears includes a main gear, a first lateral gear, and a second lateral gear, the main gear includes a second double helical gear pattern engaged with the first double helical gear pattern, the first lateral gear is engaged with the first ring gear, and the second lateral gear is engaged with the second ring gear, and
   the first ring gear is axially spaced from the second ring gear relative to the rotational axis; and
   a planet carrier including a carrier plate, a plurality of shafts, and a plurality of journal bearings, the planet carrier plate is connected to the output shaft, each shaft of the plurality of shafts is connected to a respective planet gear of the plurality of planet gears, each journal bearing is positioned between a respective shaft of the plurality of shafts and a respective planet gear of the plurality of planet gears, each journal bearing of the plurality of journal bearings extends between and to a first axial end and a second axial end, each journal bearing of the plurality of journal bearings includes a first shoulder disposed at the first axial end and a second shoulder disposed at the second axial end, and each of the first shoulder and the second shoulder positioned axially adjacent a respective planet gear of the plurality of planet gears.

2. The assembly of claim 1, wherein the first ring gear and the second ring gear are rotationally fixed relative to the rotational axis.

3. The assembly of claim 1, wherein each of the first ring gear and the second ring gear includes a first spur gear pattern and each of the first lateral gear and the second lateral gear includes a second spur gear pattern.

4. The assembly of claim 3, wherein each of the first ring gear and the second ring gear extends between and to an inner radial side and an outer radial side, and the first spur gear pattern is disposed at the inner radial side.

5. The assembly of claim 1, wherein the main gear has a first diameter and each of the first lateral gear and the second lateral gear has a second diameter, and the first diameter is greater than the second diameter.

6. The assembly of claim 1, wherein the main gear, the first lateral gear, and the second lateral gear form a monolithic body of each respective planet gear of the plurality of planet gears.

7. The assembly of claim 1, wherein the first double helical gear pattern includes a first set of helical teeth and a second set of helical teeth, and the first set of helical teeth is circumferentially staggered relative to the second set of helical teeth.

8. The assembly of claim 1, wherein the first double helical gear pattern includes a first set of helical teeth and a second set of helical teeth, and the first set of helical teeth is circumferentially aligned relative to the second set of helical teeth.

9. The assembly of claim 1, wherein the main gear has a first diameter and the sun gear has a second diameter, and the first diameter is greater than the second diameter.

10. An aircraft propulsion system comprising:
a propeller configured for rotation about a rotational axis;
a gas turbine engine including a bladed turbine rotor and a shaft connected to the bladed turbine rotor; and
a reduction gear box including a gear assembly connected to the shaft and the propeller, the gear assembly configured to drive the propeller at a reduced rotational speed relative to the shaft, the gear assembly including a sun gear, a plurality of planet gears, and a first ring gear, and a second ring gear,
the sun gear is rotatable about a rotational axis, the sun gear includes a first double helical gear pattern, and
each planet gear of the plurality of planet gears includes a main gear, a first lateral gear, and a second lateral gear, the main gear includes a second double helical gear pattern engaged with the first double helical gear pattern, the first lateral gear is engaged with the first ring gear, and the second lateral gear is engaged with the second ring gear;
wherein each of the first ring gear and the second ring gear includes a first spur gear pattern and each of the first lateral gear and the second lateral gear includes a second spur gear pattern.

11. The aircraft propulsion system of claim 10, wherein the first ring gear and the second ring gear are rotationally fixed relative to the rotational axis.

12. An assembly for an aircraft propulsion system, the assembly comprising:
an output shaft; and
a gear assembly configured to drive rotation of the output shaft, the gear assembly including a sun gear, a plurality of planet gears, a first ring gear, and a second ring gear,
the sun gear is rotatable about a rotational axis, the sun gear includes a first double helical gear pattern,
each planet gear of the plurality of planet gears includes a main gear, a first lateral gear, and a second lateral gear, the main gear includes a second double helical gear pattern engaged with the first double helical gear pattern, the first lateral gear is engaged with the first ring gear, and the second lateral gear is engaged with the second ring gear, and
each of the first ring gear and the second ring gear includes a first spur gear pattern and each of the first lateral gear and the second lateral gear includes a second spur gear pattern.

13. The assembly of claim 12, wherein each of the first ring gear and the second ring gear extends between and to an inner radial side and an outer radial side, and the first spur gear pattern is disposed at the inner radial side.

14. The assembly of claim 12, wherein the main gear has a first diameter and each of the first lateral gear and the second lateral gear has a second diameter, and the first diameter is greater than the second diameter.

15. The assembly of claim 12, wherein the first double helical gear pattern includes a first set of helical teeth and a second set of helical teeth, and the first set of helical teeth is circumferentially staggered relative to the second set of helical teeth.

16. The assembly of claim 12, further comprising a planet carrier, the planet carrier includes a carrier plate and a plurality of shafts, each shaft of the plurality of shafts is connected to a respective planet gear of the plurality of planet gears, and the carrier plate is rotationally fixed relative to the rotational axis.

* * * * *